United States Patent
Goldsteen et al.

(10) Patent No.: US 11,182,491 B2
(45) Date of Patent: Nov. 23, 2021

(54) DATA PROTECTION USING FUNCTIONAL ENCRYPTION

(71) Applicant: International Business Machines Corporation, Armonk, NY (US)

(72) Inventors: Abigail Goldsteen, Haifa (IL); Ron Shmelkin, Haifa (IL); Gilad Ezov, Nesher (IL); Muhammad Barham, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/780,971

(22) Filed: Feb. 4, 2020

(65) Prior Publication Data
US 2021/0240840 A1    Aug. 5, 2021

(51) Int. Cl.
*G06F 21/60* (2013.01)
*G06F 21/62* (2013.01)
*H04L 9/30* (2006.01)

(52) U.S. Cl.
CPC ........ *G06F 21/602* (2013.01); *G06F 21/6245* (2013.01); *H04L 9/30* (2013.01)

(58) Field of Classification Search
CPC ....... G06F 21/602; G06F 21/6245; H04L 9/30
USPC ....................................................... 713/189
See application file for complete search history.

(56) References Cited

U.S. PATENT DOCUMENTS

| | | | |
|---|---|---|---|
| 8,572,368 B1 * | 10/2013 | Deacon | H04L 63/0823 713/158 |
| 9,866,594 B2 | 1/2018 | Lim | |
| 2018/0091497 A1 * | 3/2018 | Nadler | H04L 63/10 |

OTHER PUBLICATIONS

Beiter et al. "End-to-End Policy Based Encryption Techniques for Multi-Party Data Management," Computer Standards & Interfaces 36: 689-703, 2014.
Druschel et al. "The Right to be Forgotten—between Expectations and Practice," ENISA Deliverable, Oct. 18, 2011, 22 pages.
Dufour Sans et al. "Reading in the Dark: Classifying Encrypted Digits with Functional Encryption," Cryptology ePrint archive, 2018: 17 pages.
Haas et al. "Supporting Semi-automated Compliance Control by a System Design Based on the Concept of Separation of Concerns," Privacy and Identity 2010, IFIP AICT 352: 120-129, 2011.
Korba et al. "Towards Meeting the Privacy Challenge: Adapting DRM," DRM 2002: Digital Rights Management, pp. 118-136.

(Continued)

*Primary Examiner* — Jacob Lipman
(74) *Attorney, Agent, or Firm* — G.E. Ehrlich (1995) Ltd.

(57) ABSTRACT

A method of limiting data usage for certified purposes by using functional encryption, comprising: receiving from a software publisher an application code and declared privacy information, the declared privacy information specifies at least one declared usage for at least one data type; analyzing the application's usage of data collected by the application, to identify an actual usage of the at least one data type by a function; identifying when the actual usage is compliant with the at least one declared usage according to the analysis; in response to the identification, creating a pair of a public key and a master private key; creating a function private key for the function using the master private key; and sending the function private key to the software publisher to be used for operating the function on data which is encrypted using the public key.

9 Claims, 8 Drawing Sheets

(56) References Cited

OTHER PUBLICATIONS

Pearson et al. "Sticky Policies: An Approach for Managing Privacy across Multiple Parties," IEEE Computer, 44 (9): 60-68, 2011.
Vachharajani et al. "RIFLE: An Architectural Framework for User-Centric Information-Flow Security," 37th International Symposium on Microarchitecture (2004): 12 pages.

* cited by examiner

DATA PROTECTION USING FUNCTIONAL ENCRYPTION

BACKGROUND

The present invention, in some embodiments thereof, relates to validating compliance of an application with its declared use and, more specifically, but not exclusively, to restricting use of data for validated purposes.

Issues of privacy and consent have been on the rise, due to recent changes in privacy laws and regulations around the world, as well as a few bad reputation incidents involving the misuse of users' personal data and/or illegitimate disclosure of personal data to third parties. GDPR regulation mandates the principle of proportionality (also called purpose limitation)—data should only be processed for the purpose for which it was collected (and consented to). Many additional privacy directives and laws also dictate that personally identifiable information (PII) may be used only for approved purposes, and may only be stored and used for as long as is necessary to provide the service/purpose to which the user consented. Data collected by an application/service is often shared with third parties for outsourcing, data sharing or even profit. The data collectors are, in many cases, responsible for assuring that the data is only used for the consented purposes, both internally and even after being transferred to third parties.

SUMMARY

According to an aspect of some embodiments of the present invention there is provided a method of limiting data usage for certified purposes by using functional encryption, comprising: receiving from a software publisher an application code and declared privacy information, the declared privacy information specifies at least one declared usage for at least one data type; analyzing the application's usage of data collected by the application, to identify an actual usage of the at least one data type by a function; identifying when the actual usage is compliant with the at least one declared usage according to the analysis; in response to the identification, creating a pair of a public key and a master private key; creating a function private key for the function using the master private key; and sending the function private key to the software publisher to be used for operating the function on data which is encrypted using the public key.

Optionally, the function private key is bundled with the application code by the software publisher.

Optionally, at least some of the analyzing is done by automated algorithms.

Optionally, at least some of the analyzing is done by a human.

According to an aspect of some embodiments of the present invention there is provided a computer readable medium comprising computer executable instructions, that when executed by a hardware processor, cause the hardware processor to: receive from a software publisher an application code and declared privacy information, the declared privacy information specifies at least one declared usage for at least one data type; analyze the application's usage of data collected by the application, to identify an actual usage of the at least one data type by a function; identify when the actual usage is compliant with the at least one declared usage according to the analysis; in response to the identification, create a pair of a public key and a master private key; create a function private key for the function using the master private key; and send the function private key to the software publisher to be used for operating the function on data which is encrypted using the public key.

According to an aspect of some embodiments of the present invention there is provided a system for limiting data usage for certified purposes by using functional encryption, comprising: a program store storing code; and at least one hardware processor coupled to the program store for implementing the stored code, the stored code comprising: code to receive from a software publisher an application code and declared privacy information, the declared privacy information specifies at least one declared usage for at least one data type; code to analyze the application's usage of data collected by the application, to identify an actual usage of the at least one data type by a function; code to identify when the actual usage is compliant with the at least one declared usage according to the analysis; code to create, in response to the identification, a pair of a public key and a master private key; code to create a function private key for the function using the master private key; and code to send the function private key to the software publisher to be used for operating the function on data which is encrypted using the public key.

According to an aspect of some embodiments of the present invention there is provided a method of limiting data usage for certified purposes during runtime by using functional encryption, comprising: retrieving data from a memory in response to a query for data received from an application; encrypting the queried data using a public key which is paired with a function private key and created by a purpose certifier; sending the encrypted queried data to the application to be used by a function of the application, wherein the function is operated on the encrypted queried data using the function private key which is created by the purpose certifier after verifying that actual usage of at least one data type by the function is compliant with at least one declared usage of the function.

Optionally, the encrypted queried data is sent by the application to a server, and the function is operated on the encrypted queried data on the server.

Optionally, the application is installed on a user's client device.

Optionally, the sending is done via inter-app communication from an application performing the encryption to the application which is using the function.

According to an aspect of some embodiments of the present invention there is provided a computer readable medium comprising computer executable instructions, that when executed by a hardware processor, cause the hardware processor to: retrieve data from a memory in response to a query for data received from an application; encrypt the queried data using a public key which is paired with a function private key and created by a purpose certifier; send the encrypted queried data to the application to be used by a function of the application, wherein the function is operated on the encrypted queried data using the function private key which is created by the purpose certifier after verifying that actual usage of at least one data type by the function is compliant with at least one declared usage of the function.

According to an aspect of some embodiments of the present invention there is provided a method of using data for certified purposes by using functional encryption, comprising: receiving a function private key which is created for a function from a master private key paired with a public key, wherein the function private key is created by a purpose certifier after verifying that actual usage of at least one data type by the function is compliant with at least one declared usage of the function; receiving encrypted data which is encrypted using the public key; operating the function on the encrypted data using the function private key to extract an unencrypted result of the function for the data.

According to an aspect of some embodiments of the present invention there is provided a computer readable medium comprising computer executable instructions, that when executed by a hardware processor, cause the hardware processor to: receive a function private key which is created for a function from a master private key paired with a public key, wherein the function private key is created by a purpose certifier after verifying that actual usage of at least one data type by the function is compliant with at least one declared usage of the function; receive encrypted data which is encrypted using the public key; operate the function on the encrypted data using the function private key to extract an unencrypted result of the function for the data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
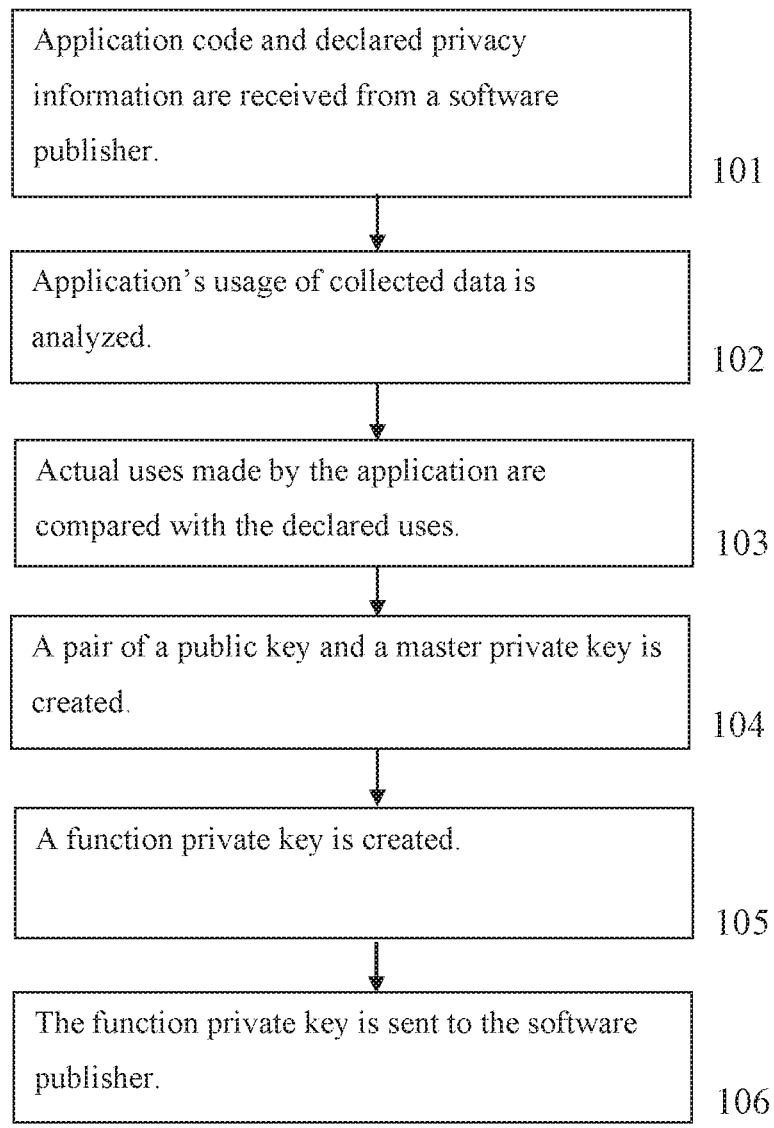
FIG. 1 is a flowchart schematically representing a method for limiting data usage for certified purposes by using functional encryption, according to some embodiments of the present invention.

In order to abide by privacy directives, it is necessary to certify applications for one or more purposes, but also to limit the use of data only to the intended purpose(s). Existing methods are capable of certifying applications for certain purposes, but cannot limit the use of collected data to these purposes alone. Attempts to limit the use of data according to certain data access provide partial solutions, but they are either limited for specific hardware or configuration, not applicable for third party applications and/or do not provide complete limitation of the use of the data. To date, there are no practical solutions for end users or enterprises to ensure that data disclosed for a specific purpose can only be used for that purpose and will in fact not be abused or reused for other, unauthorized purposes.

According to some embodiments of the present invention there is provided a mechanism based on functional encryption that enables encrypting data in a way that only a specific, pre-defined function may be computed on the data, thus limiting its use to a specific purpose. When the mechanism is used, a publisher of a software application may only use data for declared and verified purposes. This means, for example, that private data may not be processed or published in an unauthorized manner. Functional encryption enables encrypting the input and creating a key specific to a certain function. The key allows computing the result of the function over the encrypted data while even the party which is performing the computation is only able to decrypt the result of the computation, but not the data itself. Since the data itself remains encrypted, it cannot be used for other purposes. The computation of the function result is done by using the specific key, so other functions, for example, cannot use the data.

a functional encryption scheme for a given functionality $f$ consists of the four stages:

1. Creating a pair of a public key (pk) and a master private key (also referred to as a master secret key—msk) which are specific to the function ($f$), for example after verifying the purpose, for example by an application purpose certifier which validates the purpose of data usage. The public key and master secret key are unique for a given function ($f$) and may not reused across different functions (there is a one-to-one mapping between a function and its key pair), but they do not depend on the functionality of ($f$).

2. Using the master private key, for example by the application purpose certifier to generate a new private key (also referred to as a secret key—sk) which is specific to the function ($f$). The secret key depends on the function being computed.

3. Using the public key to encrypt data (x) into encrypted data (c). For example, encrypting a vector y of parameters.

4. Using the private key to calculate $f(x)$. For example, this decryption key may enable computing an inner product between the encrypted vector y and a predefined weight vector x.

This scheme allows the side which is computing the function (the application) to compute the result of the function $f$ on the encrypted data c without ever being exposed to the original data x as the data is remains encrypted.

According to some embodiments of the present invention, an application purpose certifier creates functional encryption keys. The application purpose certifier generates a master private key, public key and private key for a specific function in a specific application during validation process, after analyzing the source code of the application and the declared policy for data usage, and verifying that the actual use is compliant with the declared use. Private data may then be encrypted using the public key (which may be publically available), for example during runtime on a client device, by a dedicated encryption application and/or by an application that is installed on a user's client device by a software publisher (when verified). Using the encrypted data (for example by a server of a software publisher) is then only possible by decrypting the encrypted data using the function private key for that function. The result of the function on the data is then available to the software publisher, without access to the data itself.

In an exemplary scenario of using some embodiments of the present invention, a company which provides loan services wants to allow potential customers to estimate the possibility of taking the loan and the loan's interest. In order to allow such service, the company creates a website application which calculates a weighted mean of a customer's financial parameters, such as family income, mortgage (if exists), monthly payments, existing loans etc., and outputs the final score. The financial parameters may be notated as vector x (the data) and the weights of the financial parameters as vector y (the function), so that the inner product $<y, x>$ evaluates the desired weighted sum. Based on this score, the company defines the loan's conditions.

By using an application purpose certifier, a customer may prevent the loan company from saving these financial parameters and using them for a different purpose. Prior to the website deployment, the company requests the application purpose certifier to certify the website and its purposes. The company provides the application purpose certifier with the code that calculates the function—the above mentioned weighted mean (the vector y). The application purpose certifier validates the code and generates the following cryptographic entities: $msk_y$—master private key for generating private key $Sk_y$, and public key $Pk_y$ for encrypting financial parameters vector x, and $Sk_y$ for decrypting. The decryption output equals to inner product of $<y, x>$. The application purpose certifier provides $Sk_y$ to the loan company, which uses it to obtain the desired score (weighted mean). The application purpose certifier provides the public key $Pk_y$ to the app/website, which is used to encrypt the data (the vector of financial parameters) on a client device of the customer.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A description is now made of the process of verifying the usage of data by an application, by an application purpose certifier.

Figure 2:
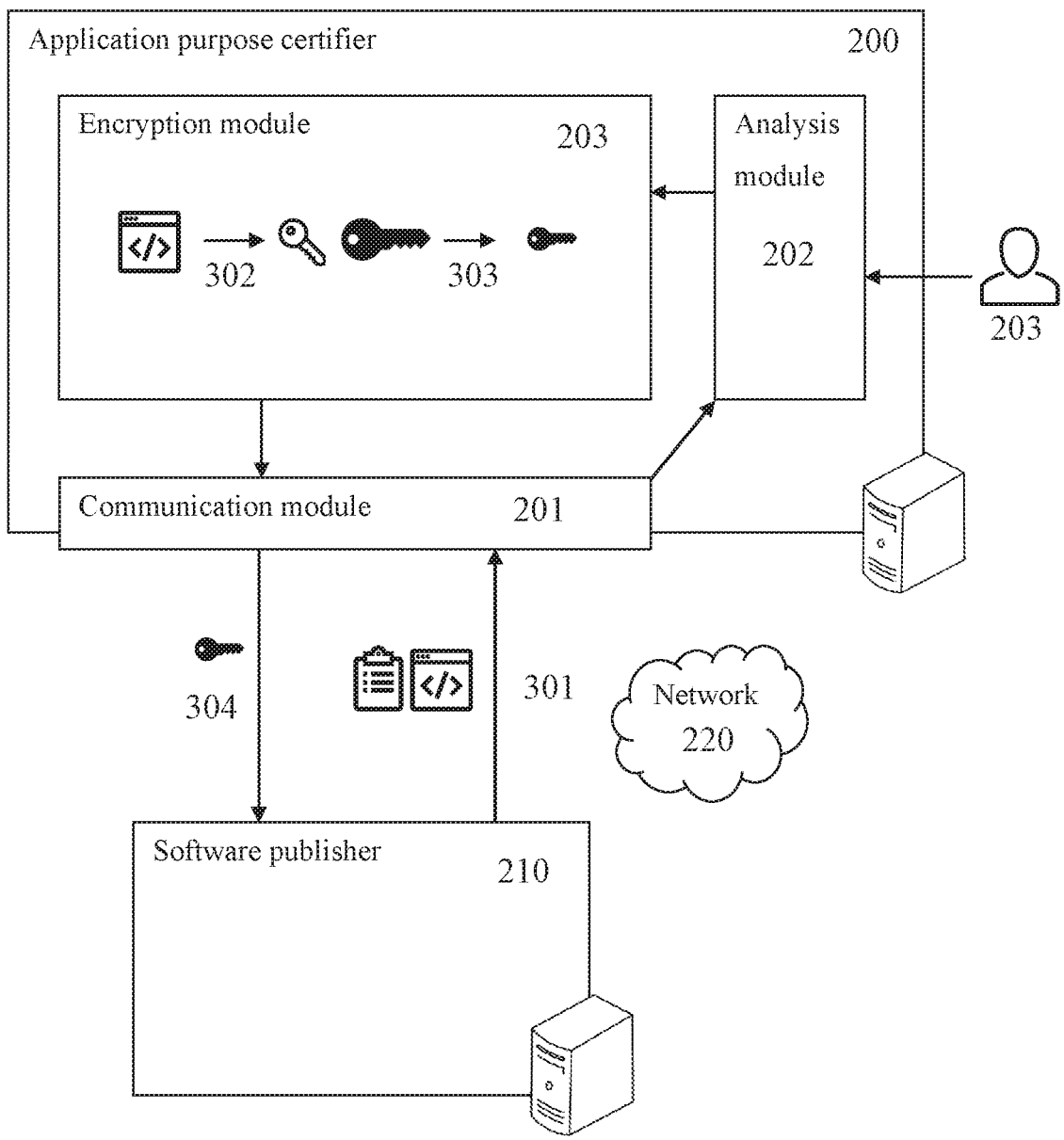
FIG. 2 is a schematic illustration of a system of limiting data usage for certified purposes by using functional encryption, according to some embodiments of the present invention.

Referring now to the drawings, FIG. 1 is a flowchart schematically representing a method for limiting data usage for certified purposes by using functional encryption, according to some embodiments of the present invention. Reference is also made to FIG. 2, which is a schematic illustration of a system of limiting data usage for certified purposes by using functional encryption, according to some embodiments of the present invention.

Application purpose certifier 200 (also referred to as system 200) may be implemented by one or more computer systems, for example connected via a network. The computer system(s) may include one or more hardware computing devices, for example, a mainframe computer, an enterprise server, a workstation, multiple connected computers, a virtual machine and/or a personal computer.

First, as shown at 101 and 301, application purpose certifier 200 receives from a software publisher 210 a network message that includes an application's code and declared privacy information. The software publisher 210 sends the message after the application code is finalized, in order to receive approval from the application purpose certifier 200. The declared privacy information includes declared usage purpose(s) for one or more types of data collected by the application. The application's code includes the source code of the application. The message may be received by a communication module 201, such as a network card or chip, connected to software publisher 210 via a network 220.

The declared usage purposes may include, for example, providing specific services such as, diabetes research, offering product information, provide advertisements, specific calculations made using the data and/or any other usage of the data.

Optionally, the allowed usage purposes are provided by software publisher as structured data, for example as data exchange format file such as JSON and/or xml file. Optionally, the allowed usage purposes are structured by software publisher using a software tool. For example, the tool may provide a platform for defining usage purposes and defining data items that are used for each of these usage purposes. The information may be stored in a dataset and converted to a data exchange format before transferred to application purpose certifier 200.

A simplified example of structured allowed usage purposes is presented herein:

```
{
    "Name": "Loan decision",
    "Description": "Decide whether someone is a good candidate for receiving a loan",
    "Id": 25,
    "Data": [
        {"Name": "Loan amount", "Type": "integer", "Mandatory": true},
        {"Name": "Annual income", "Type": "decimal", "Mandatory": true},
        {"Name": "Debt-to-income ratio", "Type": "decimal", "Mandatory": true},
        {"Name": "Approximate Fico score", "Type": "integer", "Mandatory": true},
        {"Name": "Total credit lines", "Type": "integer", "Mandatory": true},
        {"Name": "Revolving credit balance", "Type": "decimal", "Mandatory": true},
        {"Name": "Delinquencies in last 2 years ", "Type": "integer", "Mandatory": true},
        {"Name": "Employment length", "Type": "integer", "Mandatory": true}
    ]
}
```

Data types that are used for defining the allowed usage purposes may include, for example, user personal information such as name, age, gender, email and/or phone number, data extracted from the user's client device such as location history, call log and/or browsing history, data collected during the operation of the application such as usage patterns, entered data and/or activity log and/or any other type of data.

Network 220 may include, for example, local area network (LAN), a wireless network such as mobile network, wireless local area network (WLAN) such as Wireless Fidelity (WiFi™), a wireless personal area network (WPAN) such as Bluetooth™ protocol and/or any other network. Network 220 may be local, for example an internal network of an organization, or may be a general network, such as the internet.

Then, as shown at 102, each usage of a data type done by the application is analyzed. The actual usage of a data type by a function is identified. This may be done for multiple data types and multiple functions that are used by the application.

The analysis may be done by an analysis module 202, which may include analysis algorithms and/or interface for human expert(s) 203. Optionally, the general behavior of the application is also analyzed by analysis module 202.

The analysis algorithms may scan the application code to identify package and variable names that might hint at purposes other than those being certified, while unknown names may be tagged by the analysis module 202 for human review.

Then, as shown at 103, the actual usage(s) made by the function, as found by the analysis, are compared with the declared usage purposes for each data type. By this comparison, the analysis module 202 verifies that each actual usage is also declared in the declared privacy information.

Then, as shown at 104 and 302, when the actual usage is compliant with the declared usage, application purpose certifier 200, creates a pair of a public key and a master private key, for example by encryption module 203.

Then, as shown at 105 and 303, a function private key is created by application purpose certifier 200 for the function using the master private key, for example by encryption module 203.

When the actual usage is not compliant with the declared usage, a function private key is not created. Optionally, a message is sent by communication module 201 to software publisher 220, which includes a notification regarding the non-compliance.

Then, as shown at 106 and 304, the function private key is sent as a network message by communication module 201 to software publisher 220.

The public key is also distributed and/or published by communication module 201, for example as a network message to software publisher 220, to the user's client device 240 and/or may be provided publicly online.

The user's client device 240 may include, for example, a personal computer, a workstation, a mobile device such as a Smartphone, a tablet, a wearable device such as Google glass, a Smart watch, a laptop computer and/or the like, an internet of things (IoT) device and/or any device that has one or more network communication modules, such as a network card or chip.

Optionally, a digital purpose certificate is also created by the encryption module 203, which contains indication of the declared and verified usage purpose(s). The purpose certificate may include a digital signature and is unique for the specific application code, as it and an indication of the code, such as a hash. The digital purpose certificate may also be sent as a network message by communication module 201 to software publisher 220.

Figure 3:
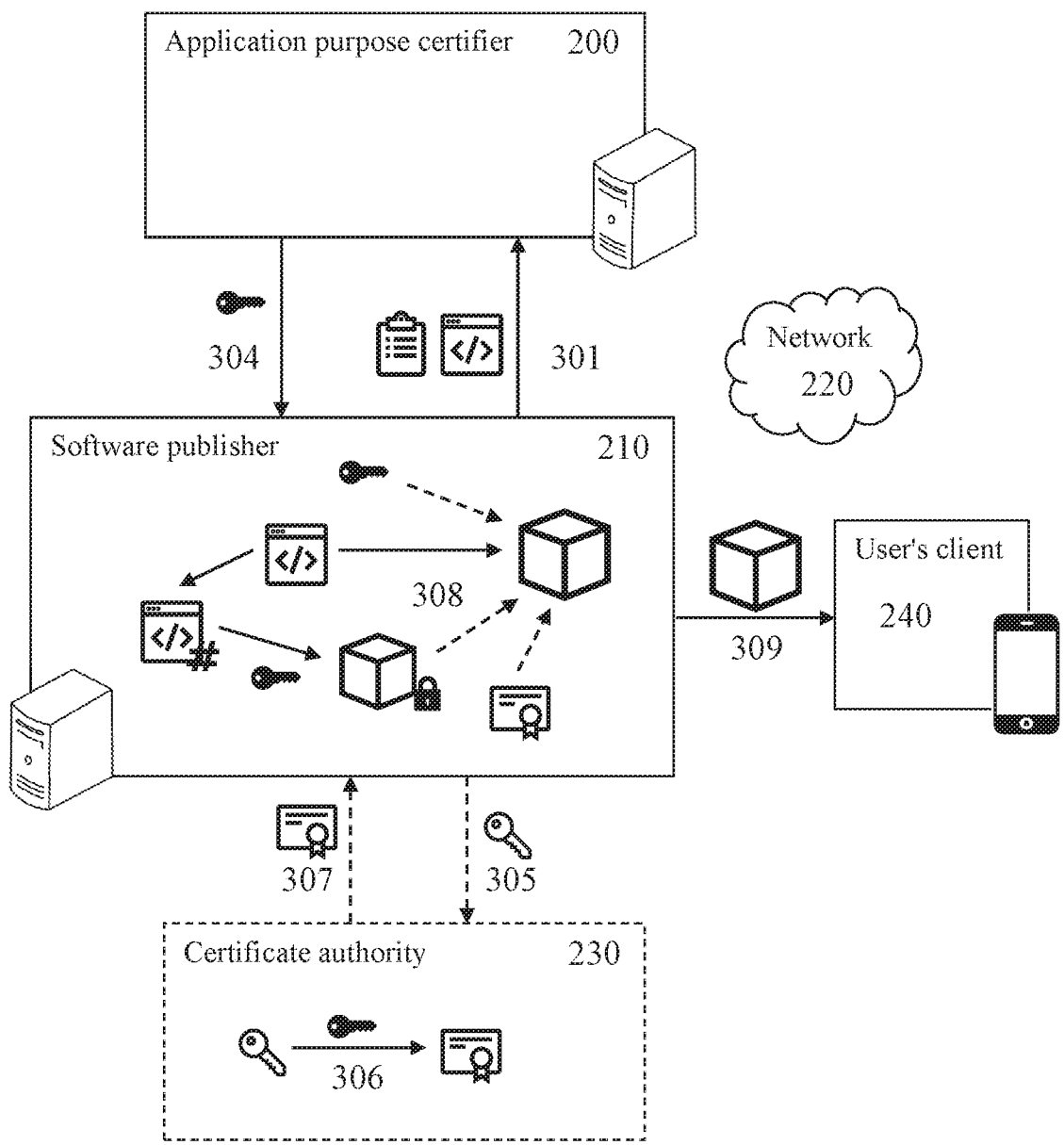
FIG. 3 is a schematic illustration of a system of limiting data usage for certified purposes by using functional encryption, including code signing and bundling, according to some embodiments of the present invention.

Reference is also made to FIG. 3, which is a schematic illustration of a system of limiting data usage for certified purposes by using functional encryption, including code signing and bundling, according to some embodiments of the present invention.

Optionally, code signing is done by a certificate authority (CA) 230. As shown at 305-307, CA 230 receives a CA public key of software publisher 220 from software publisher 220, encrypts it with its own private key and signs to create a digital publisher authentication certificate which it sends back to software publisher 220.

Optionally, software publisher 220 combines the function private key with the application code into an application bundle, for example by creating a compressed file including them, as shown at 308, to allow the application to operate the function on the data. Optionally, the publisher authentication certificate (which is created by hashing the code and signing the hashed code with software publisher's private key) and/or the purpose certificate are also included in the bundle. Software publisher 220 then distributes the application bundle to users' client devices, as shown at 309.

A description is now made of the process executed after verification process, during installation of the application and during runtime of the application, on user's client device 240.

Figure 4:
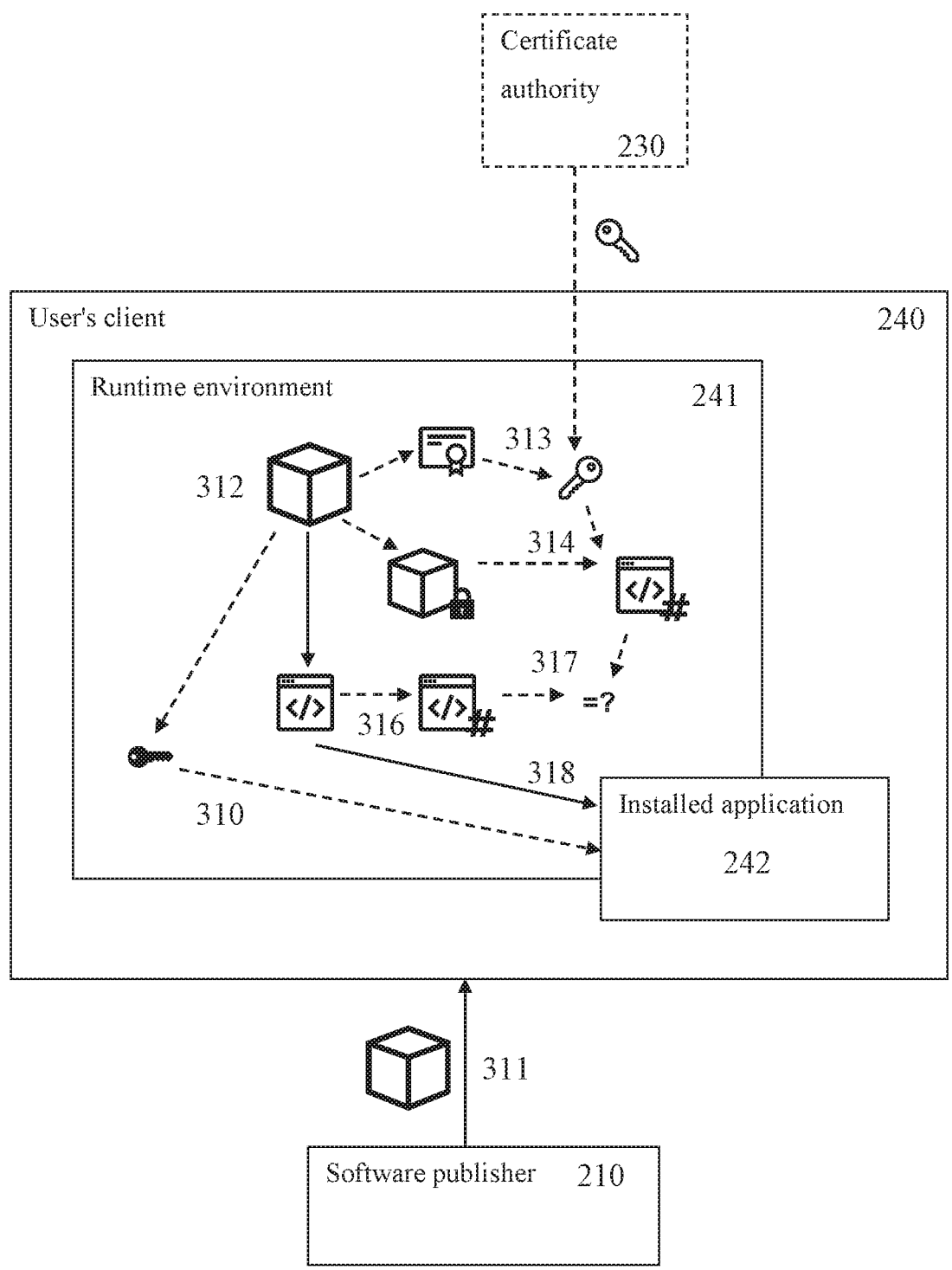
FIG. 4 is a schematic illustration of a user's client device which installs an application using functional encryption, according to some embodiments of the present invention.

Reference is now made to FIG. 4, which is a schematic illustration of a user's client device which installs an application using functional encryption, according to some embodiments of the present invention.

User's client device 240 includes a runtime environment 241, which is trusted, such as a trusted operating system (OS), Docker container, browser, and/or any other runtime environment. Trust may be established either in advance by exchanging public keys, or by use of an additional certificate authenticating the runtime environment 241, and/or by any other known method of authenticating trusted runtime environments.

For installing the application on user's client device 240, the application bundle is received from software publisher 220, as shown at 311, and opened by runtime environment 241, as shown at 312, to extract the application code and optionally the purpose certificate and the publisher authentication certificate. Optionally, using a CA public key received from CA 230, the publisher authentication certificate is decrypted to extract the publisher's public key, as shown at 313. The publisher's public key is used to decrypt the hash of the application code, as shown at 314.

Optionally, publisher's public key is used to decrypt the purpose certificate, and using a purpose certificate public key received from application purpose certifier 200, the purpose certificate is decrypted again to extract the hash of the application code and the declared privacy information.

Optionally, the application code is hashed by runtime environment 241, as shown at 316, and compared with the hash of the application code extracted from the purpose certificate, as shown at 317, to authenticate the source of the application bundle and verify that the declared privacy information relates to the correct application code.

The application code is then installed on the user's client device 240, as shown at 318.

A description is now made of optional processes of data usage during runtime.

Figure 5:
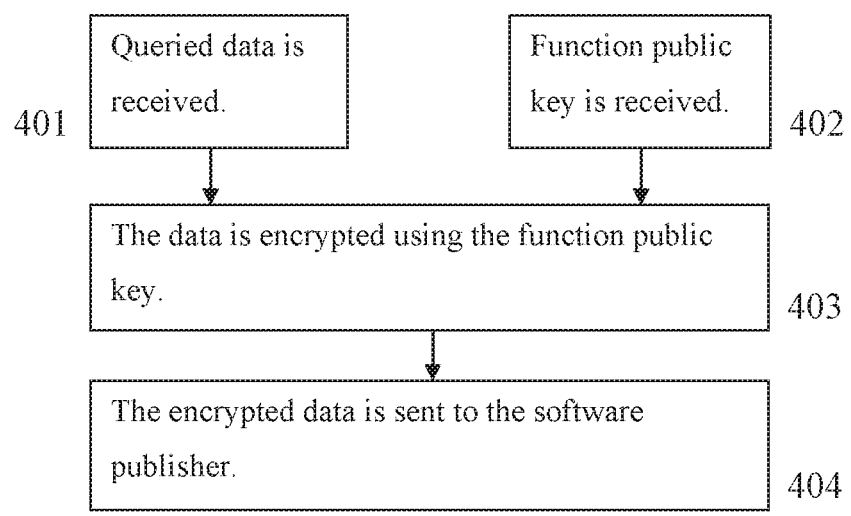
FIG. 5 is a flowchart schematically representing a method of limiting data usage for certified purposes during runtime by using functional encryption, according to some embodiments of the present invention.
Figure 6:
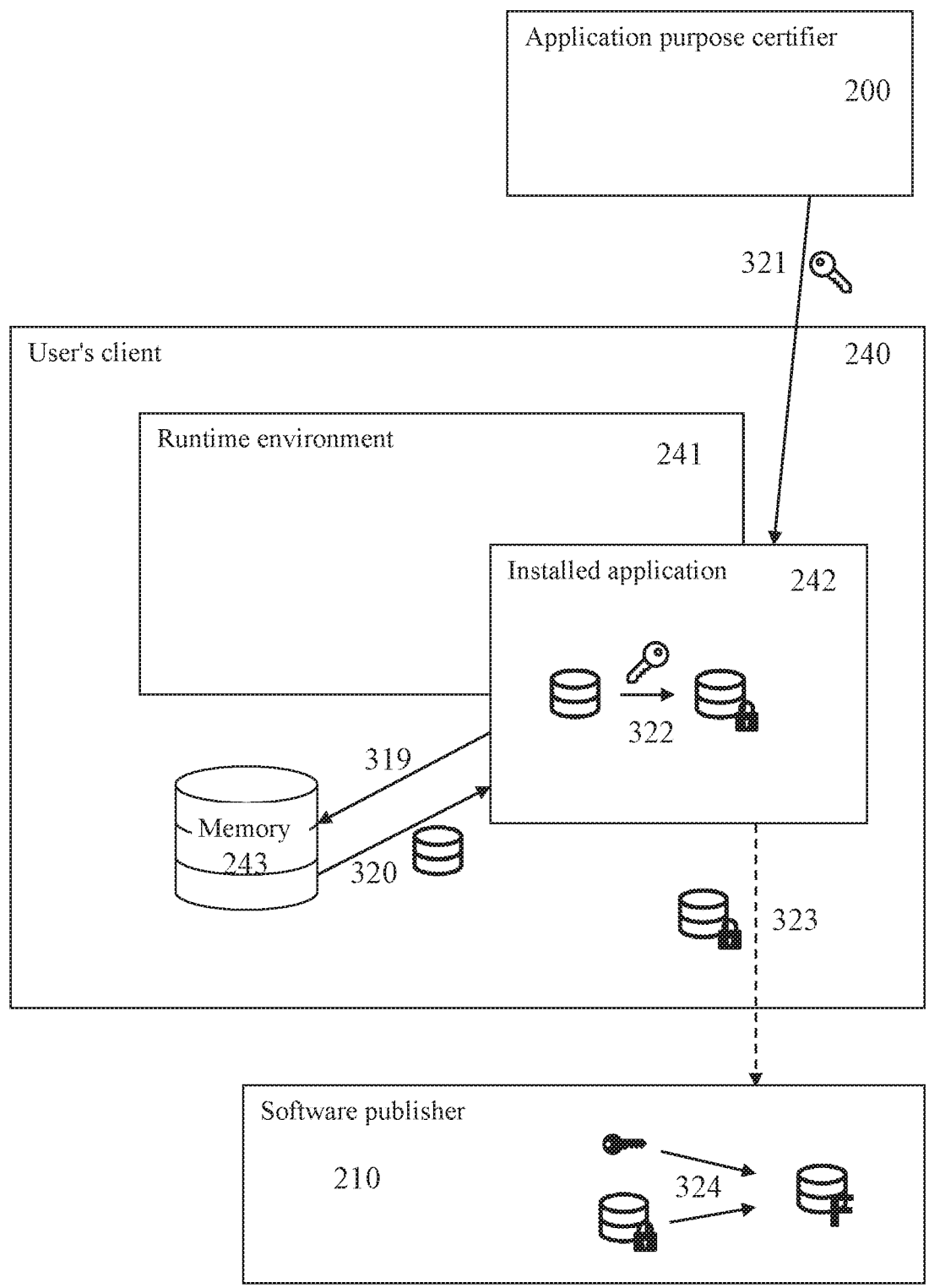
FIG. 6 is a schematic illustration of a user's client device which runs an application using functional encryption, according to some embodiments of the present invention.

Reference is now made to FIG. 5, which is a flowchart schematically representing a method of limiting data usage for certified purposes during runtime by using functional encryption, according to some embodiments of the present invention. Reference is also made to FIG. 6, which is a schematic illustration of a user's client device which runs an application using functional encryption, according to some embodiments of the present invention.

When data needs to be used by a function of a software publisher, for example by a remote server of software publisher 210, application 242 installed on a user's client device 240 sends a data query and receives the data, for example from memory 243 of user's client device 240, as shown at 319. The data may also be queried, requested and/or collected from any other source or data storage. The application then receives the queried data, as shown at 401 and 320, for example from memory 243.

The data storage may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 214 may further comprise one or more network storage resources, for example, a storage server, a Network Attached Storage (NAS), a network drive, and/or the like accessible via one or more networks through the network interface 210.

As shown at 402 and 322, application 242 receives the public key from application purpose certifier 200. This may be done, for example, by a message including the public key, by including the public key in a bundle of installation of the application, by providing the public key on the website of the application purpose certifier 200 and/or by any other method. The public key may be, for example, downloaded periodically, before runtime, from the server and/or website of the application purpose certifier 200.

Then, as shown at 403 and 322, application 242 encrypts the data using the public key. The application purpose certifier 200 may verify that this is performed by the application 242 during the process of analyzing the application code.

Then, as shown at 404 and 323, the encrypted data is sent by application 242 to software publisher 210. The software publisher 210 may then use the function private key, which was received from application purpose certifier 200, to operate the function on the encrypted data, as shown at 324, and extract an unencrypted result of the function for the data.

Figure 7:
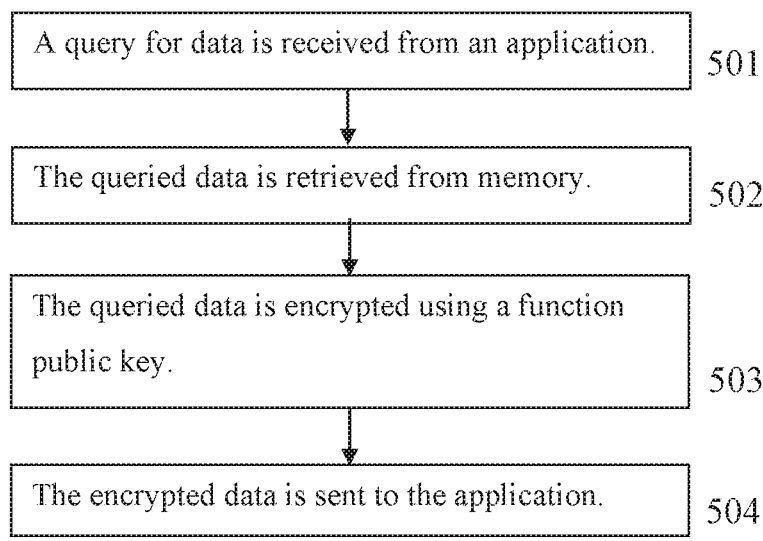
FIG. 7 is a flowchart schematically representing a method of limiting data usage for certified purposes during runtime by using functional encryption via an encryption application, according to some embodiments of the present invention.
Figure 8:
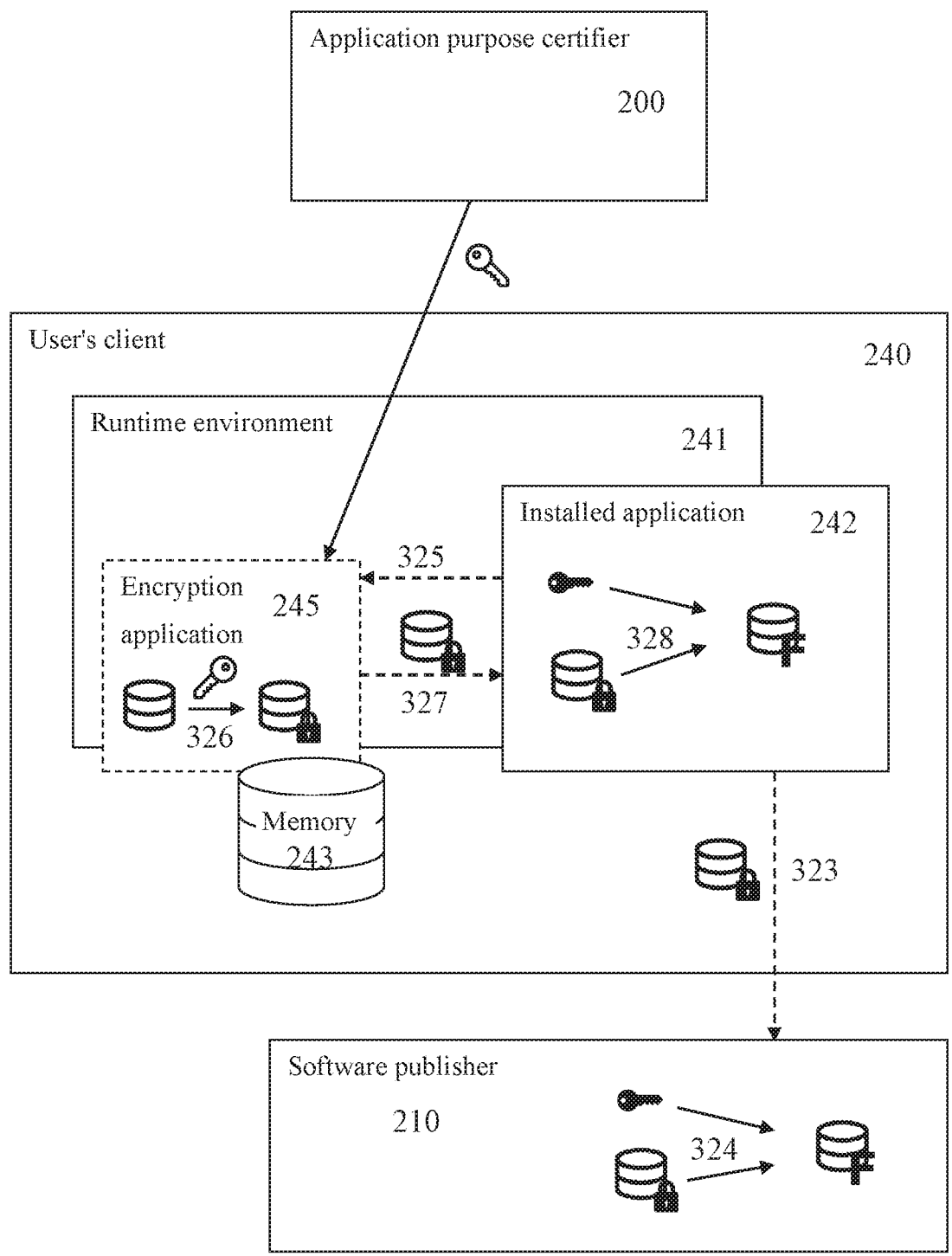
FIG. 8 is a schematic illustration of a user's client device which runs an application using functional encryption via an encryption application, according to some embodiments of the present invention.

Reference is now made to FIG. 7, which is a flowchart schematically representing a method of limiting data usage for certified purposes during runtime by using functional encryption via an encryption application, according to some embodiments of the present invention. Reference is also made to FIG. 8, which is a schematic illustration of a user's client device which runs an application using functional encryption via an encryption application, according to some embodiments of the present invention. In these embodiments, the data is encrypted by a dedicated encryption application 244 on the user's client device 240, and may then be used for calculating the function by an application of the software provider or by a server of the software provider. The encryption application 244 may be provided, for example, by the application purpose certifier 200, by the runtime environment 241 (such as OS or browser) and/or a third party.

When installed application 242 requires using data from memory 243, it sends a data query which is intercepted by an encryption application 244, as shown at 601 and 325. The encryption application 244 retrieves the queried data, for example from memory 243 as described above.

Then, encryption application 244 encrypts the queried data using a public key, as shown at 602 and 326. The public key is received from application purpose certifier 200, as described above.

Then, as shown at 603 and 327, the encrypted data is sent by encryption application 244 to installed application 242. This may be done, for example, by inter-app communication, such as intents on Android OS.

Optionally, installed application 242 may then use the function private key, which was received from application purpose certifier 200, to operate the function on the encrypted data, as shown at 328, and extract an unencrypted result of the function for the data. The function private key may be bundled with the installation package of the installed application and made available to the installed application, as shown at 310. Optionally or alternatively, installed application 242 may send the encrypted data to the software publisher 210, as shown at 323, which may then use the function private key to operate the function as described above, as shown at 324.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term functional encryption is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of limiting data usage for certified purposes by using functional encryption, comprising:
    receiving from a software publisher an application code and declared privacy information, the declared privacy information specifies at least one declared usage for at least one data type;
    analyzing the application's usage of data collected by the application, to identify an actual usage of the at least one data type by a function;
    identifying when the actual usage is compliant with the at least one declared usage according to the analysis;
    in response to the identification, creating a pair of a public key and a master private key;
    creating a function private key for the function using the master private key; and
    sending the function private key to the software publisher to be used for operating the function on data which is encrypted using the public key.

2. The method of claim 1 wherein the function private key is bundled with the application code by the software publisher.

3. The method of claim 1 wherein at least some of the analyzing is done by automated algorithms.

4. The method of claim 1 wherein at least some of the analyzing is done by a human.

5. A method of limiting data usage for certified purposes during runtime by using functional encryption, comprising:
    retrieving data from a memory in response to a query for data received from an application;
    encrypting the queried data using a public key which is paired with a function private key and created by a purpose certifier;
    sending the encrypted queried data to the application to be used by a function of the application, wherein the function is operated on the encrypted queried data using the function private key which is created by the purpose certifier after verifying that actual usage of at least one data type by the function is compliant with at least one declared usage of the function.

6. The method of claim 5 wherein the encrypted queried data is sent by the application to a server, and the function is operated on the encrypted queried data on the server.

7. The method of claim 5 wherein the application is installed on a user's client device.

8. The method of claim 5 wherein the sending is done via inter-app communication from an application performing the encryption to the application which is using the function.

9. A method of using data for certified purposes by using functional encryption, comprising:
    receiving a function private key which is created for a function from a master private key paired with a public key, wherein the function private key is created by a purpose certifier after verifying that actual usage of at least one data type by the function is compliant with at least one declared usage of the function;
    receiving encrypted data which is encrypted using the public key;
    operating the function on the encrypted data using the function private key to extract an unencrypted result of the function for the data.

* * * * *